United States Patent [19]

Dreischhoff et al.

[11] Patent Number: 5,539,023

[45] Date of Patent: Jul. 23, 1996

[54] CURING AGENTS FOR AQUEOUS EPOXY RESIN DISPERSIONS

[75] Inventors: Dieter Dreischhoff, Wiesbaden; Joerg-Peter Geisler, Ingelheim; Claus Godau, Kiedrich; Michael Hoenel; Bernhard Stengel-Rutkowski, both of Wiesbaden, all of Germany

[73] Assignee: Hoechst Aktiengesellschaft, Germany

[21] Appl. No.: 192,868

[22] Filed: Feb. 7, 1994

[30] Foreign Application Priority Data

Feb. 8, 1993 [DE] Germany .......................... 43 03 562.0

[51] Int. Cl.$^6$ .............................. C08K 3/20; C08L 63/02
[52] U.S. Cl. ........................................... 523/404; 528/110
[58] Field of Search ............................. 523/404; 528/110

[56] References Cited

U.S. PATENT DOCUMENTS

| | | |
|---|---|---|
| 4,152,285 | 5/1979 | Thomassen. |
| 4,197,389 | 4/1980 | Becker et al.. |
| 4,415,682 | 11/1983 | Becker ..................................... 523/404 |
| 4,575,523 | 3/1986 | Anderson et al. ...................... 523/414 |
| 4,608,405 | 8/1986 | DeGooyer. |
| 5,319,004 | 6/1994 | Marten et al. ........................... 525/526 |

FOREIGN PATENT DOCUMENTS

| | | |
|---|---|---|
| 0000605 | 7/1979 | European Pat. Off.. |
| 0559033 | 8/1993 | European Pat. Off.. |

OTHER PUBLICATIONS

Lee & Neville, *Handbook of Epoxy Resins*, (1967) p. 9–1.

*Primary Examiner*—Melvyn I. Marquis
*Assistant Examiner*—D. Aylward
*Attorney, Agent, or Firm*—Bierman & Muserlian

[57] ABSTRACT

Curing agents for aqueous epoxy resin dispersions obtained by reaction of an adduct (A) of at least one polyepoxide ($A_1$) and at least one polyalkylene polyether polyol ($A_2$), it being possible for the adduct (A) to be modified with a secondary amine ($A_3$) if appropriate, with I. a reaction product of an amine (B) and an epoxide (C) or II. an amine (B) and subsequent reaction with an epoxide (C), the amount of amine (B) being chosen such that the H atoms on the nitrogen are present in a 2- to 10-fold excess, based on the epoxide groups in (A).

10 Claims, No Drawings

CURING AGENTS FOR AQUEOUS EPOXY RESIN DISPERSIONS

Binder systems which harden at room temperature and are based on liquid or solid epoxy resins and suitable, usually (cyclo)aliphatic amine hardeners have proved themselves in practice for decades on the basis of their good adhesion to the most diverse substrates and their outstanding mechanical properties and resistances to chemicals. As is known, the typical curing principle is based on polyaddition of polyfunctional amines having primary and/or secondary amino groups onto the epoxide groups, leading to highly crosslinked thermosets.

Due to the constantly more stringent conditions imposed by the authorities to reduce solvents and other highly volatile harmful substances in coating materials, water-dilutable epoxide/amine binder systems are gaining increasing importance as alternatives and have been the subject of intensive research and development efforts.

In respect of curing agents, it should be remembered that polyamines are in general readily water-soluble, i.e. readily form aqueous solutions, but do not give stable emulsions in water, and, for example, epoxide emulsions therefore break, with phase separation. For preparation of aminic emulsions, amines must therefore be rendered hydrophobic, i.e. subjected to suitable chemical reactions in order to obtain reaction products which are less water-soluble.

This can be effected by addition or condensation reactions and by substitution. Modified epoxide/amine adducts, for example, are therefore known as amine hardeners for epoxy resin emulsions/dispersions.

Adducts of monoglycidyl ethers or esters and certain diamines which, in combination with customary curing accelerators and compatibilizing agents, are suitable for curing epoxy resins, especially at low temperatures, are known from EP-A-0 288 975. However, these epoxy resin hardeners are not water-dilutable.

Amine hardeners which are based on epoxy novolaks and are prepared by reaction of an epoxy novolak with an excess of polyamine containing primary amino groups and subsequent reaction of all the remaining primary amino groups with monoepoxide compounds are described in EP-A- 0 175 589. These aminic curing agents, which are not water-dilutable, are suitable only for use in combination with conventional solvent-containing epoxy resins.

U.S. Pat. Nos. 4,246,148 and 4,608,405 describe watered-dilutable epoxy resin hardeners for curing at room temperature, which are prepared as follows: a linear diepoxide is first built up from an aromatic diglycidyl ether, if appropriate a diglycidyl ether of an aliphatic diol and an aromatic polyol in the presence of a suitable catalyst and its epoxide groups are then reacted completely with a polyemine. All the primary emino groups which remain in this epoxide/amine adduct are then reacted with a monoepoxide or a monocarboxylic acid in order to prolong the useful life of the hardeners. However, these epoxy resin hardeners have several serious disadvantages:

- organic solvents must preferably be used for preparation of the hardeners and remain in the end product.
- The water-dilutability of the hardeners is achieved by (partial) neutralization of the amino groups with organic monocarboxylic acids, which escape from the film only during curing. The water-dilutable hardeners accordingly have an ionic structure and are therefore poorly compatible with, for example, nonionically stabilized aqueous epoxy resins.

The hardeners described in the U.S. Patents cited have only secondary amino groups, originating from their synthesis. Compared with hardeners which additionally also contain primary amino groups, the crosslinking density is thereby reduced, which has adverse effects on the technological properties of the epoxy resin coatings.

EP-A-0 000 605 accordingly discloses curing agents for aqueous epoxy resin dispersions, which are obtained by reacting A) an adduct of a1) at least one polyepoxide compound and a2) at least one polyalkylene polyether polyol having an average molecular weight of 200 to 10000, by reaction in an equivalent ratio of a1):a2)=2:(0.1 to 1.5), with B) a polyamine or polyamine mixture in a 2- to 10-fold excess of the N-H groups, based on the reactive epoxide groups. In this procedure, unsaturated compounds C) which are still capable of addition, such as (meth)acrylic acid, esters or amides thereof or acrylonitrile, are also added onto the reactive groups of the polyamine B).

These solvent-free nonionic curing agents for aqueous epoxy resins have outstanding technological properties, but aqueous dilute solutions of these amine hardeners are unstable at elevated temperatures, for example at above 40° C., and separate into two phases, which impedes processing.

Furthermore, the unsaturated compounds added onto the reactive groups of the polyamine are liberated as such in the context of a retro-Michael addition, especially at higher temperatures, which severely limits applications at higher temperatures, since the unsaturated compounds employed are to be classified as toxicologically unacceptable. Without the reaction with the unsaturated compounds, however, the so-called "pot life" of the coating systems prepared with the hardeners and aqueous polyfunctional epoxide compounds is too short.

There was therefore the need to eliminate these disadvantages of the hardeners described in EP-A-0 000 605 while retaining or improving the other technological properties.

This object is achieved according to the invention by water-dilutable curing agents for aqueous epoxy resin dispersions which are obtained by reaction of an adduct (A) of at least one polyepoxide ($A_1$) and at least one polyalkylene polyether polyol ($A_2$), it being possible for the adduct (A) to be modified with a secondary amine ($A_3$) if appropriate, with I. a reaction product of an amine (B) and an epoxide (C) or II. an amine (B), and subsequent reaction with an epoxide (C), the amount of amine (B) being chosen such that the H atoms on the nitrogen are present in a 2- to 10-fold excess, based on the epoxide groups in (A).

The 1,2-epoxide compounds corresponding to ($A_1$) are polyepoxides having on average more than one, preferably at least two, epoxide groups per molecule. These epoxide compounds can be either saturated or unsaturated, and aliphatic, cycloaliphatic, aromatic and/or heterocyclic, and can also contain hydroxyl groups and/or functional groups which cause no troublesome side reactions under the mixing or reaction conditions, for example alkyl or aryl substituents, ether groupings and the like. Suitable compounds are, for example, the epoxides of polyunsaturated hydrocarbons (for example vinylcyclohexene, dicyclopentadiene, cyclohexadiene, cyclododecadiene, isoprene, butadiene, 1,5-hexadiene, polybutadiene, divinylbenzenes and the like), oligomers of epichlorohydrin and the like, S- and N-containing epoxides (N,N-diglycidylaniline and N,N'-dimethyldiglycidyl-4,4-diaminodiphenylmethane) and epoxides which have been prepared by customary processes from polyunsaturated carboxylic acids or monounsaturated carboxylic acid esters of unsaturated alcohols, polyglycidyl esters, which can be obtained by polymerization or copolymerization of glycidyl esters of unsaturated acids or are obtainable from other acid compounds (cyanuric acid, diglycidyl sulfide, cyclic trimethylenetrisulfone and derivatives thereof and others) and polyglycidyl esters of polycarboxylic acids, which are obtained by reaction of epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid (for example adipic acid diglycidyl ester, phthalic acid diglycidyl ester and hexahydrophthalic acid diglycidyl ester).

The epoxide compounds ($A_1$) are preferably polyglycidyl ethers based on polyhydric, preferably dihydric, alcohols, phenols, hydrogenation products of these phenols and/or on phenolic resins (for example reaction products of mono- or polyhydric phenols with aldehydes, in particular formaldehyde, in the presence of acid catalysts). The epoxide equivalent weights of these epoxide compounds are preferably between 90 and 500 g/eq, in particular between 100 and 350 g/eq.

Polyhydric phenols which may be mentioned are, for example: resorcinol, hydroquinone, 2,2-bis-(4-hydroxyphenyl)-propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenol, 1,1-bis-(4-hydroxy-phenyl)-ethane, 2,2-bis[4-(2-hydroxypropoxy)-phenyl]-propane, 1,1-bis-(4-hydroxyphenyl)-isobutane, 2,2-bis-(4-hydroxy-tert-butylphenyl)-propane, bis-(2-hydroxynaphthyl)-methane, 1,5-dihydroxynaphthalene, tris-(4-hydroxyphenyl)-methane, bis-(4-hydroxyphenyl) ether, 2,2-bis-(4-hydroxy-3-methylphenyl)-propane, bis-(4-hydroxyphenyl) phenylmethane, bis-(4-hydroxyphenyl) diphenylmethane, 1,1-bis-(4-hydroxyphenyl)-cyclohexane, bis-(4-hydroxyphenyl) sulfone and others, and the halogenation products of the abovementioned compounds. Bisphenol A and bisphenol F are particularly preferred here.

Examples which may be mentioned of polyhydric alcohols are the hydrogenation products of the abovementioned polyhydric phenols and ethylene glycol, diethylene glycol, triethylene glycol, polyethylene glycols (n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentane glycol, cyclohexanedimethanol, trimethylolethane, trimethylolpropane and reaction products of aliphatic or aromatic polyols, for example trimethylolpropane or bisphenol A, with ethylene oxide and/or propylene oxide. A detailed list of suitable epoxide compounds is to be found in the handbook "Epoxidverbindungen und Epoxidbarze (Epoxide compounds and epoxy resins)" by A. M. Paquin, Springer Verlag, Berlin 1958, Chapter IV and in Lee, Neville, "Handbook of Epoxy Resins", Mc.Graw-Hill Book Co., 1967, Chapter 2.

The above polyfunctional epoxide compounds, this term also including the term epoxy resin, can be reacted by the present process individually or as a mixture, if appropriate in the presence of solvents.

The diglycidyl ethers of bisphenol A, bisphenol F, cyclohexanedimethanol and of the reaction product of bisphenol A with propylene oxide are preferably used as the epoxide compounds according to ($A_1$).

Suitable polyalkylene polyether polyols ($A_2$) which can be used for preparation of the curing agents according to the invention are, for example, the addition products of alkylene oxides on polyhydric alcohols or other H-acid compounds, for example amines having one or more primary or secondary amino groups. Suitable alkylene oxides are, for example, ethylene oxide, propylene oxide, butylene oxide and amylene oxide. Suitable polyhydric alcohols are aliphatic alcohols, individually or as a mixture, for example ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glycoside, pentaerythritol and sorbitol.

The alcohols or other proton-containing compounds which are suitable as starting molecules can be reacted with one or more alkylene oxide(s) individually or as a mixture, so that if several alkylene oxides are used, random copolymers or block copolymers can result. The polyalkylene polyether polyols contain primary and/or secondary hydroxyl groups, preferably primary hydroxyl groups, and are preferably polyethers which are prepared from alkylene oxides having 2 to 6 carbon atoms, for example polyethylene ether glycols, polypropylene ether glycols and polybutylene ether glycols. The polyalkylene polyether polyols can be prepared by any known process. The average molecular weight of component ($A_2$) is preferably 200 to 10000, in particular 600 to 4000.

Before their reaction with the amines (B) or the reaction products of (B) and (C), the epoxide-functional adducts (A) from the epoxide compounds ($A_1$) and the polyalkylene polyols ($A_2$) are preferably also reacted with secondary amines ($A_3$). The secondary amine acts as a chain stopper in the subsequent reaction of (A) with (B) or (B/C), and in this way allows the viscosity of the curing agents according to the invention to be controlled.

Suitable secondary amines are employed in an amount of up to 0.5 equivalent, preferably 0.02–0.25 equivalent, based on the epoxide groups contained in the adduct of ($A_1$) and ($A_2$). The mines are (cyclo) aliphatic or araliphatic secondary amines, such as, for example, diethylmnine, di-n-propylamine, diisopropylamine, dibutylamine, piperidine, pyrrolidine, N-methyl-benzylamine, diethanolmnine and the like, which can be employed individually or as a mixture.

According to the invention, aliphatic, cycloaliphatic, araliphatic and/or heterocyclic amines can be employed as component (B) by themselves or as a mixture. These amines preferably contain more than one primary and/or secondary amino group. Suitable amines (B) can also contain other functional groups, for example tertiary amino groups, hydroxyl groups, ether groups or double bonds. Examples which may be mentioned are (cyclo)aliphatic polyamines, such as, for example, ethylenediamine, 1,2-propylenedimnine, 1,3-propylenediamine, 1,4-butanediamine, 1,8-octanediamine, 1,3-diaminopentane, hexamethylenediamine, 2-methyl-pentamethylenediamine, neopentanediamine, cyclohexanediamine, 2,2,4-(2,4,4-)trimethylhexamethyleneaIiamine, TCD-diamine [5,2,1,0$^{2,6}$]-tricyclodecane, isophoronediamine, bis-(aminomethyl)cyclohexane, bis-(4-aminocyclohexyl) methane, diethylenetriamine, triethylenetetramine, tetraethylenepentamine, dipropylenetriamine, bis-hexamethylenediamine, aminoethylethanolamine, N,N-dimethylaminodipropylenetriamine, tallow fat propylenediamine, laurylpropylenediamine, polyoxyalkylenepolyamines, such as, for example, the polyamines marketed by Texaco Chemical Co. under the tradenames "Jeffamine" (for example Jeffamine(R) D 230, D 2000, T 403), dioxadecanediamine and trioxatridecanediamine, aralphatic amines, for example 1,2-, 1,3-(meta-xylylenediamine) and 1,4-bis(aminomethyl)benzene and heterocyclic polyamines, such as, for example, aminoethylpiperazine and bis-(aminopropyl) piperazine. Isophoronediamine, TCD-diamine, metaxylylenediamine and cyclohexanediamine are preferably employed as component (B). The polyamines (B) are preferably used in an amount such that the N-H groups are present in a 2- to 10-fold, preferably 4- to 9-fold excess, based on the epoxide groups in (A).

An essential constituent of the present invention is that the amino groups of the polyamines (B) are partly modified with further epoxide compounds (C) before or after their reaction with the adduct (A). This modification has the effect of a longer useful life of the binder systems formulated with the curing agents according to the invention.

The components (C) are (cyclo)aliphatic compounds with one or more epoxide groups, for example (poly)glycidyl ethers of (cyclo) aliphatic alcohols or polyols, (poly)glycidyl esters of (cyclo) aliphatic (poly) carboxylic acids or oxides of alkenes, and/or aromatic monoepoxide compounds, for example glycidyl ethers of (substituted) phenols, or oxides of aromatically substituted alkenes. Suitable compounds (C) can also additionally contain functional groups and can be employed by themselves or as a mixture. Examples which may be mentioned are: butyl glycidyl ether, ethylhexyl glycidyl ether, butanediol diglycidyl ether, hexanediol diglycidyl ether, neopentanediol diglycidyl ether, cyclohexanedimethanol diglycidyl ether, polyoxyethylene diglycidyl ether (n=2–15), polyoxypropylene diglycidyl ether (n=2–12), glycidyl ethers of higher isomeric alcohols (for example the products Grilonit® RV 1814 from Ems Chemie; Eurepox® RV-E and RV-G from Witco), the glycidyl ester of versatic acid (Cardura® E from Shell Chemie), oxides of alkyl- and arylalkenes, such as, for example, (cyclo)hexene oxide and octene oxide, phenylglycidyl ether, p-tert-butylphenyl glycidyl ether, cresyl glycidyl ether, styrene oxide and phenol (EO) 5-glycidyl ether.

The curing agents according to the invention can be prepared by two different processes which differ in respect of the time of modification of the N-H groups of the amines (B) with the epoxide compounds (C). However, the preparation of the adduct (A) is common to both processes: for this, the epoxide compound(s) $(A_1)$ and suitable polyoxyalkylene polyols (A2) are heated at temperatures of 50°–200° C., preferably 100°–180° C., in an equivalent ratio of (A1):(A2)=2:(0.1 to 1.5), preferably 2:(0.3 to 1), in the presence of a catalyst, preferably under an inert gas atmosphere, while stirring, until the desired epoxide equivalent weight, which is preferably between 200 and 4000 g/eq, and can be higher or lower than that to be calculated theoretically from the equivalent ratio of hydroxyl and epoxide groups, is reached. The reaction is expediently monitored via the increase in the epoxide equivalent, which indicates a reduction in epoxide groups. The reaction can be interrupted by cooling to below the reaction temperature.

Suitable catalysts for the preparation of the adduct of $(A_1)$ and $(A_2)$ are strong inorganic and organic bases, such as, for example, sodium hydroxide, potassium hydroxide, lithiumhydroxide, bariumhydroxide, strontium hydroxide, alkali metal alcoholares, such as sodium methylate, lithium methylate, sodium ethylate and potassium dodecylate, and the alkali metal salts of carboxylic acids, such as, for example, sodium stearate and lithium stearate. Strong inorganic and organic proton acids are likewise suitable, for example phosphoric acid, sulfuric acid, tetrafluoroboric acid and benzenesulfonic acid. Lewis acids furthermore can be used as catalysts. Examples which may be mentioned are tin(IV) tetrachloride, titanium(IV) tetrachloride, titanium(IV) tetraisopropylate, triethyloxoniumtetrafluoroborate and boron trifluoride and its complexes (for example with phosphoric acid, acetic acid (1:1 and 1:2), methanol, diethyl ether, tetrahydrofuran, phenol, ethylene glycol monoethyl ether, polyethylene glycol (molecular weight 200), dimethylsulfoxide, di-n-butyl ether, di-n-hexyl ether, succinic acid and aliphatic, cycloaliphatic and araliphatic amines as well as nitrogen-containing heterocyclic compounds). $BF_3$-Benzylamine, BF3-monoethylamine, BF3-propylamine and $BF_3$-n-butylamine are preferably employed as the catalyst. The amount of catalyst to be employed is preferably 0.1 to 3% by weight, based on the total amount of components $(A_1)$ and $(A_2)$.

As already mentioned, after completion of the condensation reaction between $(A_1)$ and $(A_2)$, the resulting epoxide-functional adduct can also be modified with secondary amines $(A_3)$. This modification is preferably carried out at temperatures of 40° to 80° C.

Finally, the adduct (A) is preferably also diluted with water to a solids content of 98–60% by weight to achieve easier handling.

According to the first process variant, a portion or the total amount of the amines (B) is first reacted with the epoxide compound(s) according to (C) at a temperature of 20° to 120° C., preferably 60° to 100° C., preferably under an inert gas atmosphere. If only a portion of the amines (B) is reacted, this portion can comprise an individual amine or several polyamines. The portion is preferably chosen such that the equivalent ratio of epoxide groups in (C) to N-H groups of the amines (B) is at least (1:2), preferably at least (1:3). The total amount of amine (B) is preferably chosen such that the equivalent ratio of epoxide groups in (C) to N-H groups in the amines (B) is (0.05 to 0.5):1. The reaction has ended when the residual epoxide equivalent weight of the reaction product of (C) and (B) is at least 30000 g/eq.

To determine the residual epoxide equivalent weight, the amine number of the reaction mixture is determined twice on samples of sufficient size, once in the presence of tetra-n-butylammonium bromide (unreacted epoxide groups also determined). The residual equivalent weight then results from the amine numbers determined from the equation:

$$\text{residual epoxide equivalent weight} = \frac{56.100}{(AN_{TBAB} - AN_0)}$$

where $AN_{TBAB}$=amine number determined in the presence of tetrabutylammoniumbromide
and $AN_0$=amine number determined without tetrabutylammonium bromide The reaction time is as a rule 15 to 240 minutes. After the end of the reaction, a further portion of the amines (B) can be admixed if appropriate. The adduct (A) is then metered in, starting at a temperature of 20° to 70° C. and while stirring, such that a temperature of 120° C., preferably 90° C., is not exceeded. After the end of the metering, the mixture is kept at 50°≧100° C., preferably at 60°–90° C., until the residual epoxide equivalent weight is at least 30000 g/eq, for which about 15 to 300 minutes are required. When a sufficiently high residual epoxide equivalent weight has been reached, polyamines (B) and/or water are also admixed, if appropriate.

The second process variant comprises first adding the adduct (A) to a portion or the total amount of the amines (B), preferably under an inert gas atmosphere, starting at a temperature of 20°–70° C. and while stirring, such that the temperature of the reaction mixture does not exceed 120° C., preferably 90° C.

When the addition has ended, the mixture is kept at 50°–100° C., preferably at 60° to 90° C., until the residual equivalent weight—determined as described above—is at least 30000 g/eq. This is in general the case after 15 to 300 minutes. Thereafter, the remaining amounts of the amines (B) is added, if appropriate, and the mixture is stirred. The epoxide compound(s) according to (C) is (are) subsequently added at a temperature of 20° to 120° C., preferably 60° to 100° C. The mixture is kept at 60° to 100° C. until the residual epoxide equivalent weight is at least 30000 g/eq, which in general requires a time of 15 to 240 minutes. If appropriate, water is then admixed.

The curing agents according to the invention are preferably prepared by the first process variant. The curing agents according to the invention can also be adjusted to a solids content of 99–20% by weight with water, in order to reduce the viscosity of the hardeners and to facilitate their handling. Corresponding amounts of water can already be added after preparation of the adduct (A) and also after reaction thereof with the modified polyamines (B).

The amine hardeners according to the invention are suitable, in combination with aqueous dispersions of polyfunctional epoxide compounds (aqueous epoxy resin dispersions) and/or water-dilutable polyfunctional epoxide compounds (water-dilutable epoxy resins), for the preparation of paints, primers, fillers, coatings, coverings, adhesives, troweling compositions and the like, and for modification of concretes, mortars and the like. Suitable resin/hardener combinations can also comprise the customary additives, such as, for example, pigments, pigment pastes, fillers, antioxidants, preservatives, flow agents and thickeners, wetting agents, foam suppressants, reactive diluents, plasticizers, catalysts, protective colloids and the like. They can furthermore also contain other curable resins which allow controlled adjustment of certain technological properties. Thus, for example, the film hardness can be increased by co-using acrylate dispersions in the epoxy resin/amine hardener combinations.

Suitable aqueous or water-dilutable epoxy resins in general comprise one or more compounds containing epoxide groups which have on average at least one, preferably at least two, epoxide groups per molecule and comprise an externally (cf., inter alia, U.S. Pat. No. 4,122,067 and EP-A 0 081 163) or an internally randomly incorporated (so-called self-emulsifying epoxy resins) emulsifier and can thus be dispersed in an aqueous medium.

Examples of such dispersions of compounds (A) containing epoxide groups are described in EP-A-51 483 and 0 491 550 and DE-A-36 43751 and 38 20301 and DE-A-4 128 487.

The most diverse use technology problems can be solved with combinations of the hardeners according to the invention with suitable aqueous and/or water-dilutable epoxy resins and suitable additives and, if appropriate, further curable resins on the basis of the outstanding properties already referred to, for example in respect of adhesion, hardness, corrosion protection action and resistance to water and chemicals.

For example, they can be used for production of primer coatings and/or protective and/or decorative coatings on the most diverse substrates, in particular rough, porous and/or damp substrates, such as wood, mineral substrates, glass, plastics (for example polyethylene, polypropylene, PC, PA or PVC), composite materials, ceramics and pretreated or untreated metals.

On the basis of their favorable properties, the curing agents according to the invention are also outstandingly suitable for formulation of one-coat paints.

They can also be used as binders for textile, organic and/or inorganic materials.

Suitable combinations can be mixed with mortar or cement, the water being used as an emulsion in order to premix the cement. Conversely, the water can be used as a solvent for the epoxy resin dispersion in the cement mixture. Addition of the curing agents according to the invention allows uniform mixing of the cement and epoxy resin/hardener dispersions. It is thus possible to obtain hardened cement.

In the case where the amine hardeners according to the invention are used in coating agents or in predominantly aqueous paints, application to the substrate is effected by conventional methods, such as, for example, brushing, spraying, dipping, rolling on and the like. The coatings harden completely at room temperature. Alternatively, they can be hardened by heating at 60° to 250° C. for a sufficiently long period of time.

In contrast to the epoxy resin hardeners described in U.S. Pat. Nos. 4,246,148 and 4,608,405, the curing agents according to the invention are nonionic in character and are water-dilutable without further neutralization, and furthermore also contain primary amino groups.

Compared with the hardeners known from EP-A 0 000 605, the hardeners according to the invention, in combination with aqueous epoxy resins, have a longer useful life and display phase separation in aqueous dilution neither at room temperature nor at elevated temperatures. At the same time, these combinations display outstanding technological properties, such as, for example, corrosion protection, hardness, resistance to water and chemicals, adhesion and the like.

The invention will be described further by the following examples.

EXAMPLES

In the examples described below, the abbreviations have the following meanings:

EV value: epoxide equivalent weight, i.e. the weight of a resin or reaction product which contains one equivalent of epoxide groups.

EAV value: amine hydrogen equivalent weight, i.e. the weight of an amine or amine hardener which contains one equivalent of N-H groups.

The viscosities are determined by the Ubbelohde method at 25° C.

1. Preparation of the polyepoxide/polyalklene polyether polyol adducts (A)

1.1. A mixture of 1200 g of polyethylene glycol 1000 (2.4 equivalents, average molecular weight 1000 g/mol) and 1920 g of Epikote® 862 (11.2 equivalents, diglycidyl ether of bisphenol F, Shell Chemie, EV value=172 g/eq) is heated at 120°–130° C., under nitrogen and while stirring, in a four liter four-necked flask fitted with an anchor stirrer, thermometer, coating device and reflux condenser, 8 g of the catalyst Anchor 1040 ($BF_3$-benzylamine complex, Anchor Chemicals) are then added, and the mixture is heated further to 160°–170° C. and kept at this temperature until an EV value of 375 g/eq is reached. Thereafter, the mixture is cooled to room temperature to give a yellowish, medium-viscosity product.

Immediately before preparation of the hardeners, 12.4 g (0.12 equivalent) of di-n-propylamine are added to 470 g (1.25 equivalents) of the adduct at 60° C., under an inert gas and while stirring, and the mixture is kept at this temperature until an EV value of 427 g/eq is reached. 25 g of deionized water are then also added and this mixture is stirred.

1.2. 1200 g of polyethylene glycol 1000 (2.4 equivalents) and 1920 g of Beckopox® EP 116 (10.7 equivalents, mixture of bisphenol A epoxy resin and bisphenol F epoxy resin, EV value 180 g/eq, Hoechst AG) are heated to 120°–130° C., under an inert gas and while stirring, in an experimental apparatus as described under 1.1., and 6.5 g of catalyst Anchor 1040 are added. The mixture is then heated to 160°–170° C. and kept at this temperature until the adduct has an EV value of 417 g/eq. It is then cooled to room temperature. Immediately before preparation of the curing agents according to the invention, 6.3 g (0.062 equivalent) of di-n-propylamine are added to 238 g (0.57 equivalent) of the adduct at 55° C. under an inert gas and the mixture is stirred at this temperature until the product has an EV value of 482 g/eq. Thereafter, 13 g of deionized water are added and the mixture is stirred.

1.3. 300 g (0.6 equivalent) of polyethylene glycol 1000, 432 g (2.4 equivalents) of Beckopox® EP 116 and 90 g (0.27 equivalent) of a diglycidyl ether based on propoxylated bisphenol A (EV value 337 g/eq, Dow Deutschland GmbH) are heated to 125° C., under nitrogen and while stirring vigorously, in a one liter four-necked flask fitted as described under 1.2. 1.4 g of the catalyst Anchor 1040 are added at this temperature and the mixture is heated to 160° C. This temperature is maintained until an EV value of 458 g/eq is reached, and the mixture is then cooled to room temperature. As described under 1.1. and 1.2., for preparation of the curing agents according to the invention, 5.5 g (0.058 equivalent) of di-n-propylamine are added to 222 g (0.48 equivalent) of the resulting reaction product at 55° C. under nitrogen, the mixture is stirred until an EV value of 530 g/eq is reached, 12.5 g of deionized water are added and the mixture is stirred.

1.4. 300 g of polyethylene glycol 1000 (0.6 equivalent), 384 g of Beckopox® EP 116 (2.1 equivalents), 93 g (0.53 equivalent) of Eurepox® RV-C (diglycidyl ether of cyclohexanedimethanol, EV value=174 g/eq, Witco) are subjected to a condensation reaction under nitrogen to an EV value of 413 g/eq analogously to the adduct preparation described in 1.3. Before preparation of aminic curing agents, 200 g (0.48 equivalent) of this adduct are reacted with 5.3 g (0.052 equivalent) of di-n-propylamine at 55° C. under nitrogen and 11 g of deionized water are then also added. EV value of the product 475 g/eq.

2. Preparation of the curing agents according to the invention 2.1. 37.9 g (0.89 equivalent) of isophoronediamine are initially introduced under nitrogen into a one liter four-necked flask with a stirrer, thermometer, reflux condenser and dropping funnel and 30.9 g (0.23 equivalent) of Epodil® 741 E (n-butyl glycidyl ether, EV value=137 g/eq, Anchor Chemicals) are added dropwise, while stirring. When the addition has ended, the mixture is heated to 80°–90° C., kept at this temperature for about 90 minutes and then cooled to 50°–60° C., 60.5 g (1.78 equivalents) of meta-xylylenediamine are added and this mixture is stirred for 30 minutes. Thereafter, 201.0 g (0.45 equivalent) of adduct 1.1. are added to the vigorously stirred amine mixture such that a temperature of 70°–90° C. is maintained. When the addition has ended, the mixture is kept at this temperature for a further two hours, 72.0 g of deionized water are then added and the mixture is stirred thoroughly. The resulting hardener has a viscosity of 26900 mPa.s and has an HAV value of 200 g/eq in the delivery form.

2.2. 34.6 g (0.25 equivalent) of Epodil® 741 E are added dropwise to 42.4 g (1.00 equivalent) of isophoronediamine under nitrogen in an apparatus analogous to that described under 2.1. When the addition has ended, the mixture is heated to 80°–90° C., kept at this temperature for 90 minutes and then cooled to room temperature, 30.5 g (0.90 equivalent) of metaxylylenediamine and 42.4 g (1 equivalent) of isophoronediamine are added and the amine mixture is stirred for 30 minutes. Thereafter, 179 g (0.35 equivalent) of adduct 1.2. are added, while stirring vigorously, such that the temperature of the reaction mixture is between 70° and 90° C. When the addition has ended, the mixture is kept at 80° C. for a further 2 hours, 72.0 g of water are then added and the mixture is stirred vigorously. Viscosity of the product 17000 mPa.s, HAV value 175 g/eq.

2.3. The same apparatus as described under 2.1. is used. 34.4 g (0.25 equivalent) of Epodil 741 E are added dropwise to 42.6 g (1.00 equivalent) of isophoronediamine, under nitrogen and while stirring, and the mixture is then heated at 80°–90° C. for 90 minutes. After cooling to 50°–60° C., 179.0 g (0.37 equivalent) of adduct 1.2. are added such that the temperature of the reaction mixture is 60°–80°C., and the mixture is then kept at this temperature for a further 90 minutes. Thereafter, 30.5 g (0.89 equivalent) of meta-xylylenediamine and 42.4 g (1.00 equivalent) of isophoronediamine are added and the mixture is stirred for 90 minutes. Finally, 471 g of water are also stirred in. The hardener had a viscosity of 1700 mPa.s and an HAV value of 350 g/eq.

2.4. 37.0 g (0.87 equivalent) of isophoronediamine are initially introduced into the customary apparatus. 35.0 g (0.22 equivalent) of Grilonit® RV 1812 (diglycidyl ether of 1,6-hexanediol, Ems Chemie, EV value=159 g/eq) are added dropwise, under nitrogen and while stirring vigorously. When the addition has ended, the mixture is heated at 70°–80° C. for 90 minutes and then cooled to room temperature and 28.4 g (0.83 equivalent) of meta-xylylenediamine and 39.4 g (0.93 equivalent) of isophoronediamine are added. 190.0 g (0.42 equivalent) of adduct 1.1. are added to this mixture at 60°–70° C. and the mixture is then kept at 70°80° C. for 60 minutes. After cooling to room temperature, the mixture is diluted with 72 g of water. Viscosity of the hardener 60000 mPa.s, HAV value 200 g/eq.

2.5. Analogously to 2.4., 43.6 g (1.03 equivalents) of isophoronediamine are initially introduced into the reaction vessel and 47.4 g (0.26 equivalent) of DOW D.E.R. 736 (diglycidyl ether of polypropylene glycol, n=4, Dow Chemical Deutschland GmbH, EV value= 185 g/eq) are slowly added, under nitrogen and while stirring vigorously. When the addition has ended, the mixture is heated at 70°–80° C. for 90 minutes and 79.0 g (1.86 equivalents) of isophorone-diamine are then added at room temperature. 158.0 g (0.35 equivalent) of adduct 1.1. are metered into this mixture at 60°–70° C. such that the temperature of the reaction mixture does not exceed 90° C. When the addition has ended, the mixture is kept at 70°–80° C. for 60 minutes and, after cooling to room temperature, is diluted with 74.0 g of deionized water. Viscosity of the hardener 50000 mPa.s, HAV value 175 g/eq.

2.6. Analogously to 2.4., 85.0 g (2.00 equivalents) of isophoronediamine are initially introduced into the reaction vessel and are reacted with 34.4 g (0.27 equivalent) of Epodil® 741 E, under nitrogen and while stirring vigorously. When the addition has ended, the mixture is kept at 70°–80° C. for 90 minutes and, after cooling to 40°–50° C., 179.0 g (0.35 equivalent) of adduct 1.2. are metered in such that a temperature of 90° C. is not exceeded during this procedure. When the metering in has ended, the mixture is kept at 70°–80° C. for 90 minutes and 30.5 g (0.90 equivalent) of meta-xylylenediamine and 72 g of deionized water are then also added at room temperature. Viscosity of the hardener 50000 mPa.s, HAV value 175 g/eq.

2.7. 85.0 g (2.00 equivalents) of isophoronediamine are initially introduced into the customary apparatus, 34.0 g (0.25 equivalent) of Epidol® 741 E are then slowly added, under nitrogen and while stirring, and the mixture is then heated at 70°–80° C. for 90 minutes. It is cooled to 40°–50° C. and 192.5 g (0.39 equivalent) of adduct 1.4. are metered in such that a temperature of 90° C. is not exceeded. When the metering in has ended, the mixture is kept at 70°–80° C. for 60 minutes and is then allowed to cool, and 30.5 g (0.90 equivalent) of meta-xylylenediamine and 75 g of deionized water are then added and the mixture is stirred vigorously. Viscosity 44000 mPa.s, HAV value 184 g/eq.

2.8. 182.0 g (0.32 equivalent) of adduct 1.3. are metered into the reaction product of 85.0 g (2.00 equivalents) of isophoronediamine and 34.0 g (0.25 equivalent) of Epodil 741 E analogously to the example described in 2.7. After the holding time and cooling have ended, 30.5 g (0.90 equivalent) of meta-xylylienediamine and 74.0 g of deionized water are also added and the mixture is stirred thoroughly. Viscosity of the end product 27500 mPa.s, HAV value 175 g/eq.

2.9. 34.5 g (0.25 equivalent) of Epodil® 741 E are added dropwise to 42.5 g (1.00 equivalent) of isophoronediamine in the customary apparatus, under nitrogen and while stirring vigorously. The mixture is then heated to 70°–80° C. and this temperature is maintained for 90 minutes. The mixture is then cooled, and 42.5 g (1.00 equivalent) of isophoronediamine and 30.5 g (0.90 equivalent) of meta-xylylenediamine are added. After this mixture has been stirred vigorously, 179.0 g (0.36 equivalent) of adduct 1.4. are added, starting at about 50° C., such that the temperature of the reaction mixture does not exceed 90° C. After the metering in, the mixture is kept at 70°–80° C. for 60 minutes. Thereafter, it is cooled, and 73.0 g of deionized water are also added. The hardener has a viscosity of 10400 mPa.s and an HAV value of 175 g/eq.

2.10. 85.0 g (2.00 equivalents) of isophoronediamine and 30.5 g (0.90 equivalent) of meta-xylylenediamine are initially introduced into an apparatus as described in Example 2.1. under nitrogen. 179.0 g (0.35 equivalent) of adduct 1.2. are added at a temperature of 60° C., while stirring, such that a temperature of 80° C. is not exceeded. The mixture is then kept at 70°–80° C. for 150 minutes. Thereafter, 34.4 g (0.25 equivalent) of Epodil® 741 E are added at 70° C. and the mixture is stirred at 70°–80° C. for 60 minutes. Finally, the mixture is cooled and 72.0 g of deionized water are also added. Viscosity of the hardener 60000 mPa.s, HAV value 175 g/eq.

Some properties of the curing agents according to the invention mentioned in the examples are summarized in Table 1.

TABLE 1

| | Properties of the curing agents according to the invention | | | | |
|---|---|---|---|---|---|
| Example No. | Adduct used | Solids content [%] | Viscosity (Ubbelohde) [mPa · s] | H equivalent weight (HAV value) [g/eq] | Stability in 20% strength aqueous dilution at 40° C. |
| 2.1. | 1.1. | 80.0 | 26,900 | 200 | about 5 hours |
| 2.2. | 1.2. | 80.0 | 17,000 | 175 | about 2 days |
| 2.3. | 1.2. | 40.0 | 1,700 | 350 | >14 days |
| 2.4. | 1.1. | 80.0 | 65,000 | 200 | >7 days |
| 2.5. | 1.1. | 80.0 | 50,000 | 175 | >4 hours |
| 2.6. | 1.2. | 80.0 | 50,000 | 175 | >5 days |
| 2.7. | 1.4. | 80.0 | 44,000 | 184 | >5 days |
| 2.8. | 1.3. | 80.0 | 27,500 | 175 | about 5 hours |
| 2.9. | 1.4. | 80.0 | 10,400 | 175 | >2 days |
| 2.10. | 1.2. | 80.0 | 60,000 | 175 | >5 days |
| BECKOPOX EH 623 (hardener according to EP 0 000 605) | — | 80.0 | 11,000 | 200 | <0.5 hour |

3. Use technology tests

Curing agents according to the invention (Examples 2.1., 2.2., 2.3., 2.6., 2.7 and 2.9.) and the amine hardeners BECKOPOX® EH 623 w (according to EP 605) and Beckopox VEH 2133 w (Hoechst AG) are subjected to use technology tests, the results of which are summarized in Table 2.

Table 3 shows the results of corrosion protection testing of hardeners 2.2. and 2.3. in comparison with BECKOPOX special hardener EH 623 w.

Explanation of the testing conditions:

a) Useful life: after the hardener and dispersion have been mixed, films are drawn with a wet film thickness of 200 μm every half an hour. The appearance of clouding in the film after complete curing indicates the end of the processing time and is recorded as the test result.

b) Dry to dust: glass beads sprinkled on the film can no longer be removed with a brush after complete curing.

c) Free from tackiness: the glass beads can be removed with a brush after complete curing.

d) Flow: after mixing of the hardener and dispersion, films are drawn with a wet film thickness of 200 μm. After drying, the film flow is evaluated.
The evaluation ranges from 0=very good, trouble-free flow to 5=no flow, severe disturbances in film (DIN 53 230).

e) Film clouding: after mixing of the hardener and dispersion, films are drawn with a wet film thickness of 200 μm. After drying and curing, the films are evaluated in respect of clouding. The evaluation scale ranges from 0=clear film to 5=completely cloudy, non-transparent film.

f) König pendulum hardness: DIN 53 157.

g) Resistance to water (after 24 hours, storage at room temperature): films drawn with a wet film thickness of 200 μm on glass plates are tested after storage in water for 24 hours at room temperature. The evaluation scale ranges from 1=very good to 5=poor.

h) Erichsen indentation (determination of the elasticity in accordance with DIN ISO 1520): pigmented paints are sprayed onto pickled sheet iron such that a dry film thickness of about 50 to 60 μm results. The coated sheets are tested in an Erichsen indentation tester after drying for 7 and 14 days and for 4 weeks. The indentation is interrupted when the paint surface shows the first crack or the film detaches from the substrate. The indentation value is stated in mm.

i) Salt spray test for 500 hours: DIN 53 167 k) Tropic test for 500 hours: DIN 50 017

TABLE 2

Use technology properties of the curing agents according to the invention

| Curing agent | BECKOPOX(R) EH 623 w | BECKOPOX(R) VEH 2133 w | Ex. 2.1. | Ex. 2.2. | Ex. 2.3. | Ex. 2.6. | Ex. 2.7. | Ex. 2.9. |
|---|---|---|---|---|---|---|---|---|
| Amount of hardener [parts by weight] | 21.7 | 16.2 | 21.7 | 21.7 | 38.0 | 19.0 | 20.2 | 14.3 |
| Amount of epoxy resin dispersion [parts by weight]*) | 100.0 | 100.0 | 100.0 | 100.0 | 100.0 | 100.0 | 100.0 | 80.6 |
| Deionized water [parts by weight] | 21.7 | 13.8 | 21.7 | 21.7 | 0.0 | 19.0 | 20.2 | 14.2 |
| Useful life | 150 min. | 90 min. | 195 min. | 180 min. | 185 min. | 255 min. | 240 min. | 180 min. |
| Dry to dust | 30 min. | 25 min. | 45 min. | 35 min. | 25 min. | 25 min. | 40 min. | 20 min. |
| Free from tackiness | 6 h | 4 h 30 min. | 8 h | 5 h | 5 h 45 min. | 6 h | 8 h | 2 h 30 min. |
| Flow | 0–1 | 0–1 | 0 | 0–1 | 1 | 0–1 | 0–1 | 0 |
| Film clouding | 0 | 0 | 0–1 | 0 | 0 | 0 | 0 | 0–1 |
| Pendulum hardness | | | | | | | | |
| after 1 day | 30 s | 40 s | 44 s | 99 s | 75 s | 35 s | 41 s | 69 s |
| after 2 days | 75 s | 81 s | 94 s | 123 s | 114 s | 77 s | 96 s | 82 s |
| after 7 days | 131 s | 148 s | 132 s | 168 s | 160 s | 181 s | 143 s | 144 s |
| Resistance to water | 3 | 2–3 | 2 | 1–2 | 2 | 3 | 2 | 2 |

*)The product BECKOPOX(R) VEP 2385 (Hoechst AG) was used as the epoxy resin dispersion.

TABLE 3

Corrosion protection properties of the curing agents according to the invention

| Curing agent | BECKOPOX(R) EH 623 w | BECKOPOX(R) VEH 2133 w | Ex. 2.2. **) | Ex. 2.3. **) |
|---|---|---|---|---|
| Pendulum hardness | | | | |
| after 7 days | 78 | 80 | 69 | 77 |
| after 30 min/80° C. | 91 | 93 | 81 | 90 |
| Erichsen indentation | | | | |
| Layer thickness [μm] | 63 | 61 | 58 | 60 |
| after 1 week | 6.3 mm | 6.1 mm | 6.7 mm | 6.6 mm |
| after 2 weeks | 6.8 mm | 5.7 mm | 6.5 mm | 6.3 mm |
| after 5 weeks | 4.1 mm | 4.4 mm | 6.4 mm | 5.9 mm |
| Salt spray test for 500 hours | | | | |
| Layer thickness [μm] | 58 | 58 | 57 | 59 |
| Blistering | m1g1 | m1g1 | m1g1 | m0g0 |
| Adhesion loss zone | 13–14 mm | 11–12 mm | 10 mm | 12–14 mm |
| Rust zone | 10 mm | 9 mm | 8 mm | 9 mm |

TABLE 3-continued

Corrosion protection properties of the curing agents according to the invention

| Curing agent | BECKOPOX(R) EH 623 w | BECKOPOX(R) VEH 2133 w | Ex. 2.2. **) | Ex. 2.3. **) |
|---|---|---|---|---|
| Tropic test for 500 hours | | | | |
| Layer thickness [µm] | 61 | 61 | 62 | 64 |
| Blistering | m1g1 | m1g1 | m1g0 | m0g0 |
| Adhesion 2 hours after exposure | 5 | 4 | 3 | 3 |
| Adhesion 24 hours after exposure | 4 | 3 | 1 | 0 |
| Surface rust | 0–1 | 0 | 0 | 0 |

**) Mixing ratio of curing agent/resin as stated in Table 2.
The product BECKOPOX (R) VEP 2385 (Hoechst AG) was used as the epoxy resin dispersion.

We claim:

1. A curing agent for aqueous epoxy resin dispersions obtained by reaction of an adduct (A) of at least one polyepoxide ($A_1$) and at least one polyalkylene polyether polyol ($A_2$), the adduct (A) optionally being modified with a secondary amine ($A_3$) with I. a reaction product of an amine (B) and an epoxide (C) or II. an amine (B), and subsequent reaction with an epoxide (C), the amount of amine (B) being such that the H atoms on the nitrogen are present in a 2- to 10-fold excess, based on the epoxide groups in (A).

2. A curing agent as claimed in claim 1 wherein the epoxide compounds (C) employed are at least one member of the group consisting of aliphatic and cycloaliphatic mono- and diepoxides and aromatic monoepoxides in an equivalent ratio of reactive epoxide groups in (C) to N-H groups in (B) of (0.05–0.5):1.

3. A curing agent as claimed in claim 1, wherein the epoxide compounds (C) employed are at least one member of the group consisting of n-butyl glycidyl ether, 2-ethylhexyl glycidyl ether, cyclo-hexanedimethanol diglycidyl ether and polypropylene glycol diglycidyl ether with [n=] the number of repeating polypropylene units in the polypropylene glycol being from 2 to 12.

4. A curing agent as claimed in claim 1 wherein component ($A_1$) is a water-insoluble polyepoxide compound and component ($A_2$) is a water-soluble polyoxyalkylene glycol.

5. A curing agent as claimed in claim 4 wherein component ($A_1$) is at least one member selected from the group consisting of the diglycidyl ether of bisphenol A, bisphenol F, cyclohexanedimethanol and a reaction product of bisphenol A with propylene oxide and component ($A_2$) is polyethylene glycol.

6. A curing agent as claimed in claim 1 wherein the secondary amine ($A_3$) is at least one member selected from the group consisting of aliphatic, cycloaliphatic and araliphatic secondary amines in an amount of up to 0.5 equivalent based on the epoxide groups contained in adduct (A).

7. A curing agent as claimed in claim 6 wherein the secondary amine ($A_3$) is in an amount of 0.02 to 0.25 equivalents based on the epoxide groups contained in adduct (A).

8. A curing agent as claimed in claim 1 wherein the polyamine (B) is at least one member selected from the group consisting of aliphatic amines, cycloaliphatic amines, araliphatic amines and heterocyclic amines.

9. A curing agent as claimed in claim 8 wherein the polyamine (B) is at least one member selected from the group consisting of isophoronediamine, cyclo-hexanediamine, TCD denotes $5,2,1,0^{2,6}$]-tricyclodecane-diamine and m-xylylenediamine.

10. A curing agent as claimed in claim 1 having a solids content of 99 to 20% by weight in water.

* * * * *